July 24, 1923.
C. W. H. MILLER
ENSILAGE HARVESTER
Filed March 14, 1921
1,462,765
4 Sheets-Sheet 1
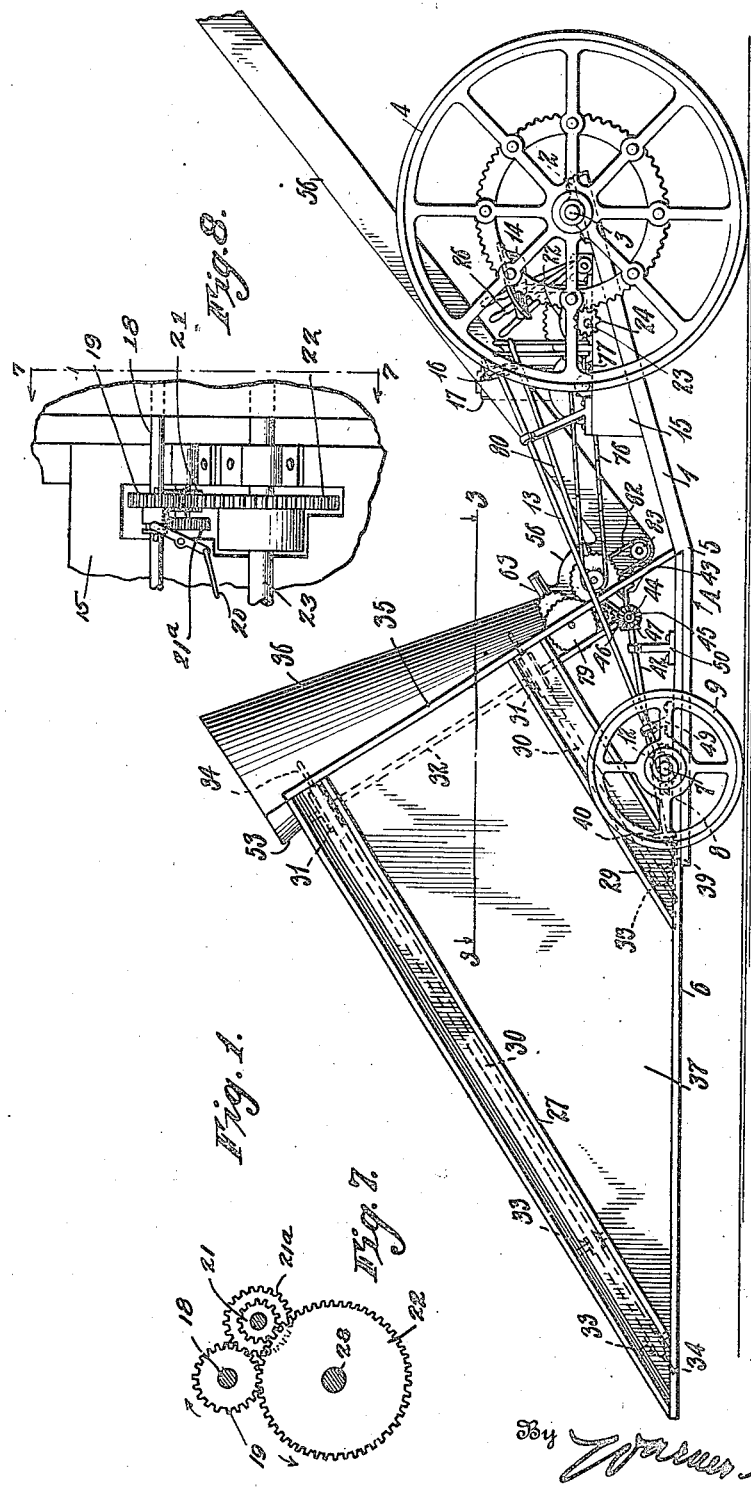
Inventor
Charles W. H. Miller

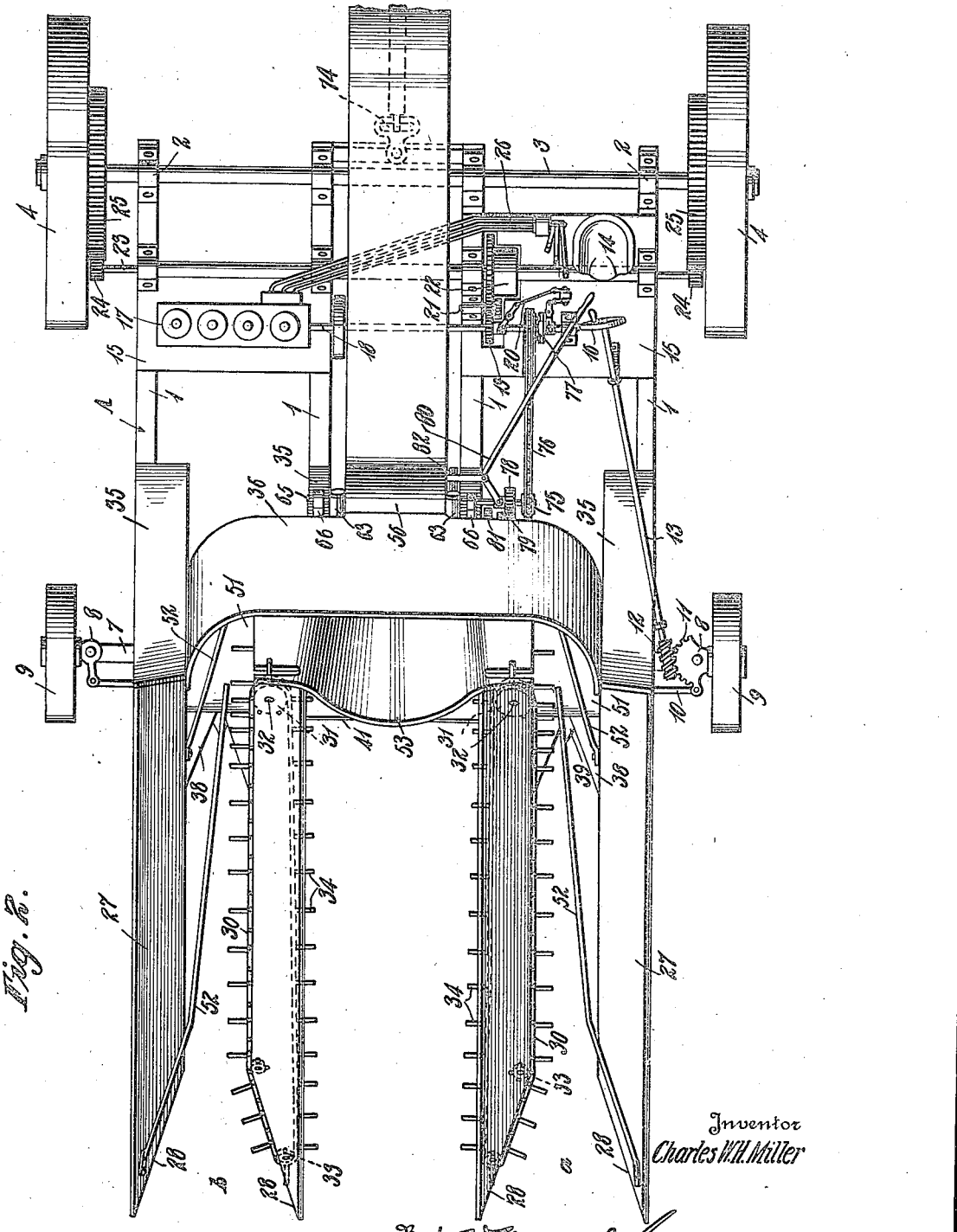

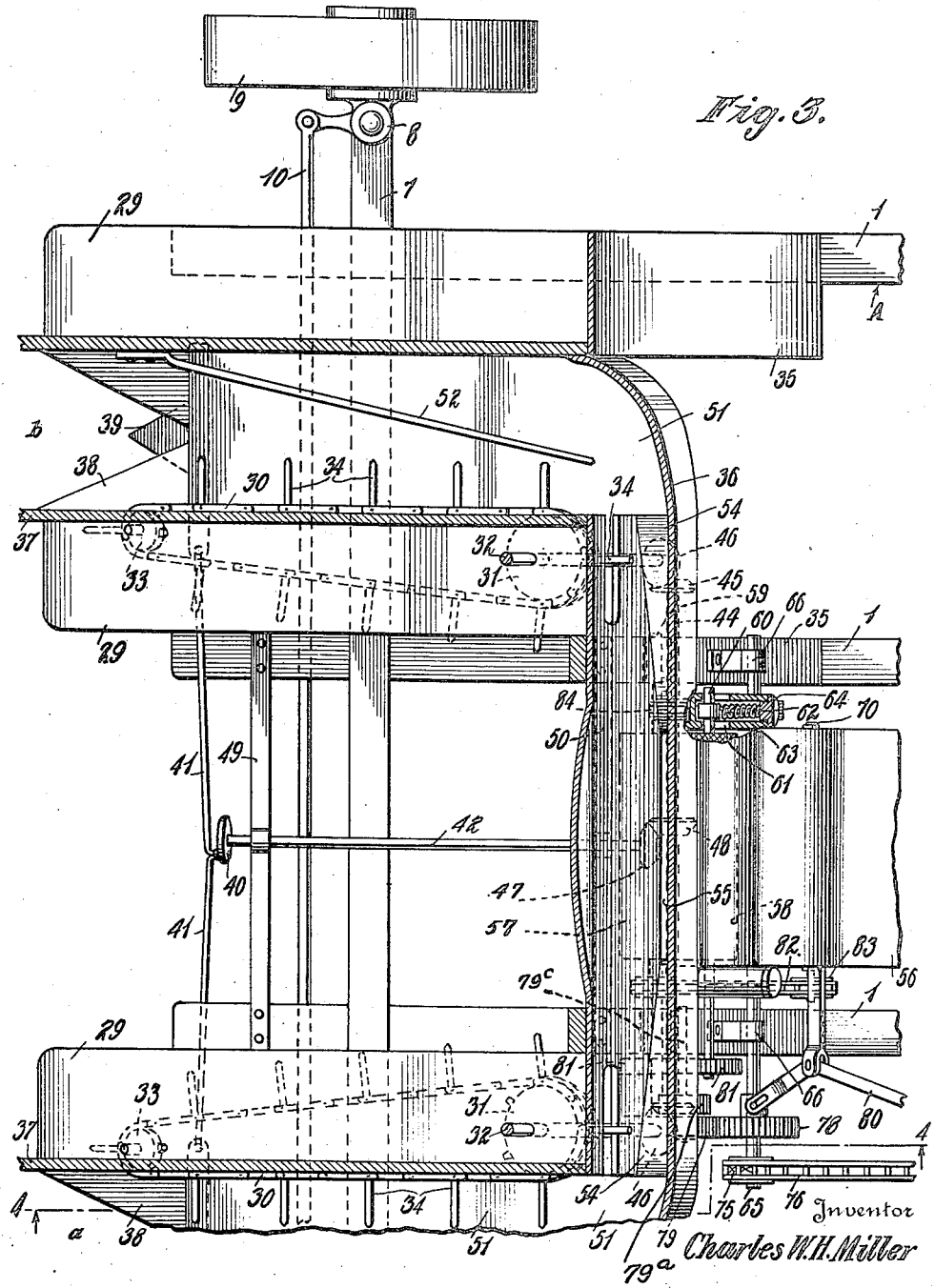

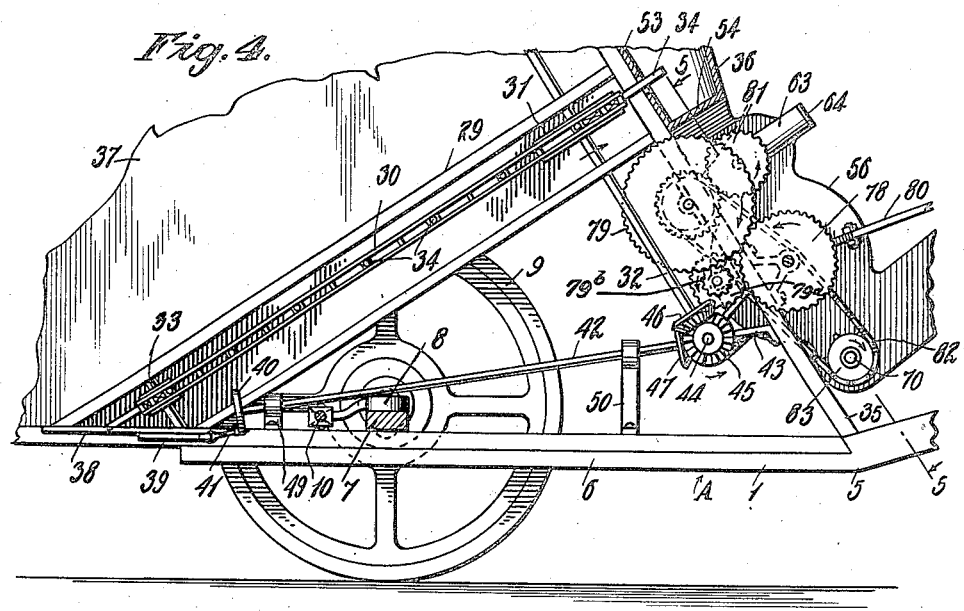
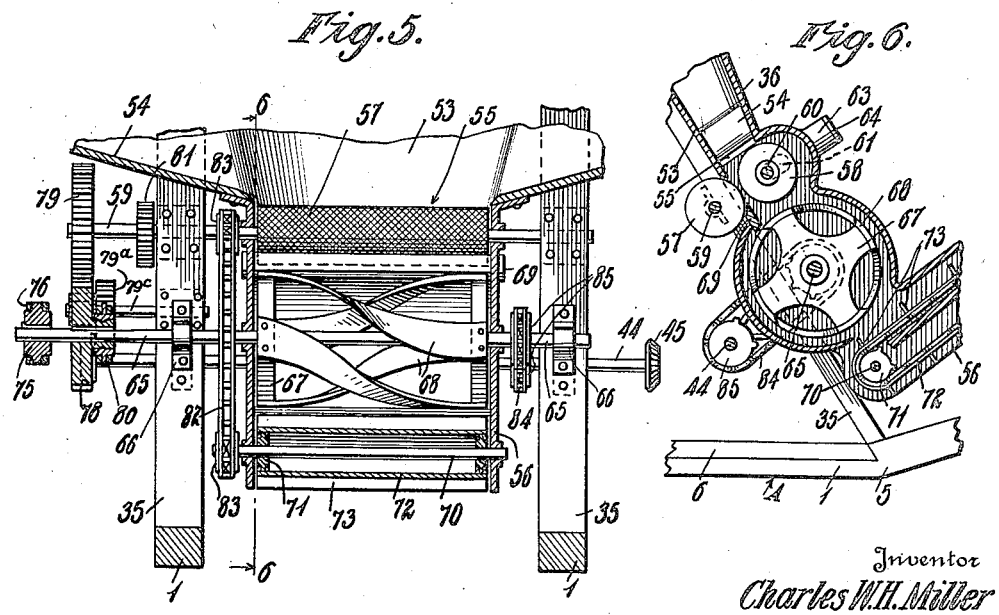

Patented July 24, 1923.                                                              1,462,765

UNITED STATES PATENT OFFICE.

CHARLES W. H. MILLER, OF LOSTANT, ILLINOIS.

ENSILAGE HARVESTER.

Application filed March 14, 1921. Serial No. 451,947.

*To all whom it may concern:*

Be it known that I, CHARLES W. H. MILLER, a citizen of the United States, residing at Lostant, in the county of La Salle and State of Illinois, have invented new and useful Improvements in Ensilage Harvesters, of which the following is a specification.

My invention relates, in its broad aspect, to improvements in harvesting machines, and more particularly it is designed for harvesting and primarily treating certain types of crops usually used in the preparation of ensilage.

In order to clearly define the principal embodiments of my invention, and its objects and peculiar advantages, it is pointed out that it is essentially an improvement upon that type of ensilage harvester which first gathers the ensilage material, afterwards chops it into small particles and then delivers it to a receiving vehicle or receptacle which is carried as an adjunct to the harvester. Ensilage material affected by my harvester follows a regular course from the front to the rear of the machine where it is delivered to a trailer. Furthermore, in my harvester the cut stalks of the ensilage material are delivered by the gathering mechanism in a slightly inclined position to the chopping apparatus from both sides of a centrally arranged receiving hopper, consequently the force of gravity is a definite factor in directing the stalks between feed rollers for the chopping mechanism which is disposed directly beneath the hopper, and which delivers to an endless conveyor extending rearwardly of the machine to a receiving trailer (not shown). The above described peculiar arrangement of the principal distinct units of my harvester assembly permits of the use of double gathering and cutting apparatus thereby increasing the capacity of the harvester, and eliminates trampling and crushing of growing crops and resistance to locomotion produced by extensive wheel and body spread. It is also pointed out that a material decrease is effected by the foregoing arrangement in the number of mechanical devices required to accomplish the desired results.

While the foregoing distinguishing features and objects of my invention may be considered as the most apparent from the stand-point of general construction and arrangement of parts, other and equally important objects and advantages exist by virtue of the novel detailed construction of the separate elements thereof. Among these latter objects and advantages are: first, to provide means whereby the stalks of ensilage material will be positively prevented from clogging or choking the hopper; second, to provide automatic compensating means for effecting uniform pressure of the feed rollers upon various sizes of stalks; third, to provide simple means for enclosing or housing all of the principal operating parts of the guiding, chopping and conveying mechanism; fourth, to effect reverse action of the chopping mechanism whereby to scavenge the same and prevent clogging, and; fifth, to provide positive and co-operative means for actuating the moving parts of the cutting, chopping and conveying mechanism of my harvester so that the total number of parts thereof are reduced to a minimum.

To these and other ends, my invention consists in the construction, arrangement and combination of parts described hereinafter and pointed out in the claims.

One embodiment of my invention is represented by way of example in the accompanying drawings, wherein:

Figure 1 is a side elevation of my ensilage harvester,

Figure 2 is a top plan view thereof,

Figure 3 is a sectional view taken on the line 3—3 of Figure 1,

Figure 4 is a sectional view taken on the line 4—4 of Figure 3 and shows to advantage the actuating means for the chopping mechanism.

Figure 5 is a sectional view taken on the line 5—5 of Figure 4, and shows in detail the chopping mechanism, and its relation to the feed rollers, and, Figure 6 is a sectional view taken on the line 6—6 of Figure 5 and shows to advantage the feed-rollers, the chopping mechanism and hopper with respect thereto, and a portion of the endless conveyor.

Figure 7 is a side elevation in section, taken on the line 7—7 of Figure 8 showing the arrangement of the gearing for forward and reverse movement.

Figure 8, is a detail view of the transmission used with my harvester.

In the drawings wherein like characters of reference designate like or similar parts throughout the several views, (A) designates generally the frame or body of my harvester which, in the present instance, is constructed with four parallel, longitudinal supporting beams (1), upon the rear ends of which is mounted by means of brackets (2), the rear axle (3) carrying the rear wheels (4). Each of the beams (1) is bent as at (5) intermediate its extremities so that the forward portion of the body (A) will hang nearer to the ground than the rear portion, and each of the beams is cut away forwardly from the points of bend (5) to receive extensions (6). The beams (1) have mounted thereon adjacent their forward ends a fixed front axle (7) provided with conventional steering knuckles (8) upon which the forward wheels (9) of the harvester are mounted. A suitable rod (10) connects the steering knuckles, and a segmental rack (11) is formed on one steering knuckle which meshes with a worm gear (12), so that upon actuation of the worm gear the wheels will be simultaneously turned to move the harvester in the direction desired. A steering rod (13) is fixed to the worm gear and extends rearwardly of the body to a point adjacent the operator's seat (14) which is mounted on one of two platforms (15) attached forwardly of the rear axle to the beams (1). A suitable steering wheel (16) of any desired type is mounted on the steering rod (13) for an obvious purpose. Mounted upon the other of the two platforms (15) is a power plant (17) having a shaft (18) on which is carried for independent sliding movement only, a drive gear (19) which may be actuated from the operator's seat (14), through a conventional lever arrangement (20), to mesh with either of two gears (21ª) and (22). Gears 21ª and 21 are cast integral and gear 21 is at all times in mesh with a driven gear (22) keyed to a transverse shaft (23) secured to the rear of the power plant upon the beams (1). Upon the ends of the shaft (23) are fixed pinions (24) meshing with large gears (25) carried by the rear wheels of the harvester, so that by shifting the drive gear (19) the forward motion of the harvester may be attained as well as the usual reverse action. Of course slight changes may be made in the arrangement of the gearing above described, and especially in the manner of shifting the same, which is conventional, but particular attention is directed to the general arrangement for reasons hereinafter set forth. Control over the operation of the power plant (17) is maintained by lever connections generally designated by (26) extending to a point adjacent the driver's seat (14).

Extending upwardly and inclined rearwardly from the forward ends of the extensions (6) are spaced parallel pairs of forward gathering frames (27), the lower ends of each complementary set of which (see Figure 2) are cut away diagonally as at (28) to facilitate the passage of the stalks of ensilage crops therebetween. The rearward sets of gathering frames (29) are constructed in substantially the same manner as the sets (27) and are parallel thereto, but their lower ends are secured in any suitable manner to the extensions (6) a short distance in advance of the forward wheels (9) of the harvester (see Figure 1). Mounted between the innermost of each of the sets of gathering frames are endless chains (30) which are trained about driving cogs (31) mounted on shafts (32), and about idler cogs (33) pivotally mounted in the forward ends of the frames. Each of the chains (30) is provided with a plurality of fingers (34) which are adapted to engage the stalks of the ensilage material and assist in moving the same upwardly and toward the rear of the harvester as the harvester is propelled over the ground. The rear ends of the outermost of each of the gathering frames is attached in any suitable manner to rearwardly and downwardly inclined frame members (35), to which are attached the side edges of a U-shaped hopper (36) which extends upwardly above the forward gathering frames and downwardly slightly below the lower gathering frames (see Figures 1 and 4). The general inclination of the hopper is forwardly of the harvester as shown in Figure 1, so that the stalks of ensilage material are moved between the frames of each gathering set by the chains (30) and the forward movement of the harvester, into the hopper. From the foregoing it will be understood that each set of gathering frames consists of two upper frames (27) and two lower frames (29), and the sets will hereinafter be lettered a and b for the sake of clarity. In order that ensilage material gathered by the frame sets a and b will not become disengaged therefrom, and also to protect the frames, partitioning walls (37) are secured in any suitable manner to the frames as illustrated in Figures 1 and 3.

Mounted upon the lowermost frames (29) of each of the sets (a) and (b) are pairs of complementary diagonal plates (38) beneath which are mounted for reciprocation suitable sickles (39) the purpose of which are to cut the stalks of ensilage crops as the harvester is propelled over the ground. Engaging each one of the sickles (39) and pivoted eccentrically to a circular disc (40) are rods (41), and the disc (40) is mounted upon a shaft (42) so that upon rotation of the shaft (42) the rods are actuated to reciprocate the sickles (39) for the purpose set forth.

Extending transversely of the body (A) of the harvester and mounted in hangers (43) upon the frame members (35) is a shaft (44) having beveled gears (45) mesh-mechanism a drive chain (84) is trained over gears (85) keyed respectively to the shafts (65) and (44); the shaft (44) as before described being the power shaft for the gathering chains (30) and the reciprocating knives (39).

In operation, as my ensilage harvester is moved over a field, two rows of the crop are affected, the gathering sets (a) and (b) each operating upon one row. The stalks of the crops pass between complementary gathering frames (27) and (29) and are engaged by the fingers (34) on the gathering chains (30) and are held thereagainst by the rods (52). When the stalks reach the knives (39) they are severed and are moved up the platforms (51) into the hopper where the force of gravitation delivers them through the opening (55) in the floor of the hopper to the feed rollers (57) and (58). As the feed roller (58) is resiliently held against the feed roller (57) by the springs in the casings (63) the stalks are positively engaged and are fed gradually to the curved chopping blades (68), after which the particles thereof are removed by the conveyor belt (72) to the rear of the harvester and delivered into a trailer (not shown). Particular attention is here called to the simplicity of my harvester resulting in the utilization of a minimum number of operating parts, and the effective manner in which the gathered crop is moved over the shortest and most logical path during the process of its preparation into ensilage and to its final delivery into a trailer after being so prepared.

While in the foregoing, there has been illustrated and described such combination and arrangement of elements as constitute the preferred embodiment of my invention, it is nevertheless desired to emphasize the fact that interpretation of the invention should only be conclusive when made in the light of the subjoined claims.

Having described my invention and its objects with such attention to detail as will thoroughly acquaint one skilled in the art with its construction and advantages, I claim—

1. An ensilage harvester comprising a two-part hopper, one part of said hopper being curved intermediate its breadth, the other part of said hopper extending behind and around the ends of the first part in spaced relationship thereto, and independent means for gathering crops extending to and arranged on each side of the first part of the hopper whereby to deliver the gathered material to the hopper through the space between said first part and said second part.

2. In an ensilage harvester including a body portion, and a plurality of means for gathering crops carried by the body portion, a hopper for receiving the crops formed with dependent sections, one of said sections being mounted between the innermost of the gathering means, and curved throughout a portion of its breadth, and the other of said sections engaging the outermost of the gathering means and disposed in spaced relationship to the first named section.

3. In an ensilage harvester including a body portion, and a plurality of means for gathering crops carried by the body portion, a hopper for receiving the crops formed with dependent sections, one of said sections being mounted between the innermost of the gathering means and extending across the ends thereof, said section being curved throughout that portion of its breadth extending between the sections, and the other of said sections engaging the outermost of said gathering means and disposed in spaced relationship to the first named section and curved to extend about the side edges of said section.

4. In an ensilage harvester including a body portion, and a plurality of gathering frames carried by the body portion, means carried by the frames for positively moving the crops in a vertical position, a forwardly inclined hopper for receiving the crops formed with dependent sections, one of said sections being mounted between the innermost of the gathering frames and bent forwardly throughout a portion of its breadth to throw the gathered crops forwardly at an angle exceeding the inclination of the hopper, the bend in said section decreasing toward the bottom of the section, and the other of said sections engaging the outermost of said gathering frames and disposed in spaced relationship to the first named section.

5. In an ensilage harvester including a body portion, and a plurality of means for gathering crops carried by the body portion, a hopper having front and rear sections for receiving the gathered crops, means carried by the body portion for chopping the gathered crops, a plurality of feed rollers interposed between the hopper and chopping means, the rear section of said hopper being extended and curved to form a pocket for receiving one of said feed rollers, and resilient means connected with said feed roller for exerting sustained pressure upon the roller whereby to normally force it out of the pocket and against the crops fed from the hopper, and means for actuating the other feed roller and the chopping means.

6. In an ensilage harvester including a body portion, and a plurality of means for gathering crops carried by the body portion, lateral frame members carried by the body portion, and the outermost of said gathering means extending to the frame members, a hopper formed with dependent sections, carried by the body portion, one of the sections of the hopper extending between and being ing with beveled gears (46) carried by the shaft (32), and upon the free end of the shaft (42) is also fixed a beveled gear (47) meshing with a third beveled gear (48) keyed to the shaft (44) intermediate its ends, so that the gathering chains (30) and sickles (39) will be actuated simultaneously upon rotation of the shaft (44). The manner of actuating the shaft (44) will be hereinafter described. It is also pointed out that the forward end of the shaft (42) is journalled through a bracing bar (49) mounted on two of the beams (1), and the rear end thereof is journalled in a hanger (50) also mounted upon two of the beams (1).

Extending upwardly at an incline from the plates (38) beneath the hopper (36) are platform members (51) the purpose of which is to cause stalks of the harvested ensilage crop to ascend to the hopper under the force exerted by the fingers (34) of the gathering chains (30) and in order to prevent disengagement of the stalks from the fingers, slightly resilient guiding rods (52) are mounted upon the outermost gathering frames (27) and (29). Extending between the gathering sets (a) and (b) and across and attached to each of the innermost gathering frames (27) and (29) of those sets is an apron (53) the central portion of which is bent outwardly toward the front of the harvester, and in general terms the members (36) and (53) form what may be called the hopper assembly. The floor (54) of the hopper which is formed by a continuation of the material forming the members (36) and (53) inclines downwardly from the inclined platforms (51) so that when the stalks are delivered to the hopper in the manner previously described they will descend down the inclined floor (54) to an opening (55) formed therein. The edge portions of the floor surrounding the opening (55) are riveted to a housing or casing (56) (see Figure 5) the purpose of which will hereinafter appear.

As the stalks of the harvested crop delivered to the hopper move to the opening (55) in the floor (54) thereof they are received between feed rollers (57) and (58). The feed roller (57) is mounted upon a shaft (59) secured by brackets to the two innermost frame members (35) of the body, and the feed roller (58) is mounted upon a shaft (60) the ends of which pass through slots (61) in the housing or casing (56) and are engaged by coil springs (62) mounted in cylindrical casings (63) fixed to the housing. Each of the casings has an adjustable and removable head (64) against which the springs seat so that the pressure which they exert upon the ends of the shaft (60) may be regulated. Mounted upon a shaft (65) the ends of which are journaled in brackets (66) fixed to the innermost frame members (35) (see Figure 5) is a drum (67) carrying curvilinear cutting blades (68) which, upon rotation of the drum, ride across a removable cutting bar (69) extending through the casing (56) directly in line with the contact point between the feed rollers. From the foregoing it will be seen that the stalks are first grasped by the feed rollers (57) and (58), and then chopped by the blades (68) upon rotation of the drum (67). Beneath the drum (67) and journaled in openings in the side walls of the casing (56) is a shaft (70) upon which is keyed a roller (71), and trained over the roller (71) is an endless conveyor belt (72). The conveyor belt (72) is provided with transversely arranged receiving cups or partitioning members (73), for retaining the chopped ensilage material, and the conveyor in its entirety extends upwardly and rearwardly at an incline (see Figure 1) to the end of the casing (56) where it delivers to a trailer (not shown) attached to the rear of the harvester. A suitable cross-bar and eye (74) (see Figure 2) is mounted on the innermost beams (1) of the body of the harvester for attaching the trailer thereto.

In order to rotate the cutting blades (68) and the feed rollers, and also actuate the conveyor roller (71), the shaft (65) is provided with a cog (75) over which is trained a drive chain (76). The drive chain (76) is also trained about a sprocket wheel upon the power shaft (18) and a conventional clutch (77) is provided adjacent the driver's seat for an obvious purpose. Keyed for independent sliding movement only upon the shaft (65) is a gear (78) which normally is in mesh with a driven gear (79) on the shaft (59) of the feed roller (57), but which may be moved to mesh with the larger of two idler gears 79ª and 79ᵇ mounted on a stub shaft 79ᶜ. The smaller of these two gears is always in mesh with the gear 79 as shown in Figure 4. A suitable gear shifting arrangement (80) is provided whereby to shift the gear 78 to reverse the rotation of the feed roller (57), whereby to remove any clogging matter which might become wedged between the rollers. Also mounted on the shaft (59) is a gear (81) which meshes with a similar gear on the shaft of the feed roller (58) when no ensilage is being received between the feed rollers. The conveyor is driven from the shaft (59) through the instrumentality of a chain (82) trained over sprocket wheels (83) keyed to the shafts (59) and (70). Thus it will be seen that the shaft (65) is operatively connected with the shaft (59) of the feed roller (57) which in turn is operatively connected with the shaft (70) to actuate the conveyor. In order that the gathering and cutting apparatus may also be operated simultaneously with the feeding, chopping and conveying attached to the frame members, the other section of the hopper extending between the innermost of said gathering means and being attached thereto for the purpose set forth.

7. In an ensilage harvester including a wheeled body portion, a forwardly inclined receiving hopper, upper and lower, rearwardly and upwardly inclined gathering frames leading to the hopper, said frames being arranged in complementary pairs in proximity to the sides of the body portion, means for cutting the stalks of crops carried by the body beneath the lowermost of each of the gathering frames, means for chopping the gathered crops arranged beneath the hopper and operatively connected with the cutting means whereby the same are actuated simultaneously, an upwardly and rearwardly inclined conveyor extending beneath the chopping means, and means carried by certain of the gathering frames and operatively connected with the cutting means for positively moving the gathered crops from the cutting means to the hopper.

In testimony whereof I affix my signature hereto.

CHARLES W. H. MILLER.